Jan. 21, 1969  C. E. VAN NOSTRAND, SR  3,422,910
TORQUE INPUT SHAFT AIR HAMMER ATTACHING DEVICE
Filed April 25, 1967
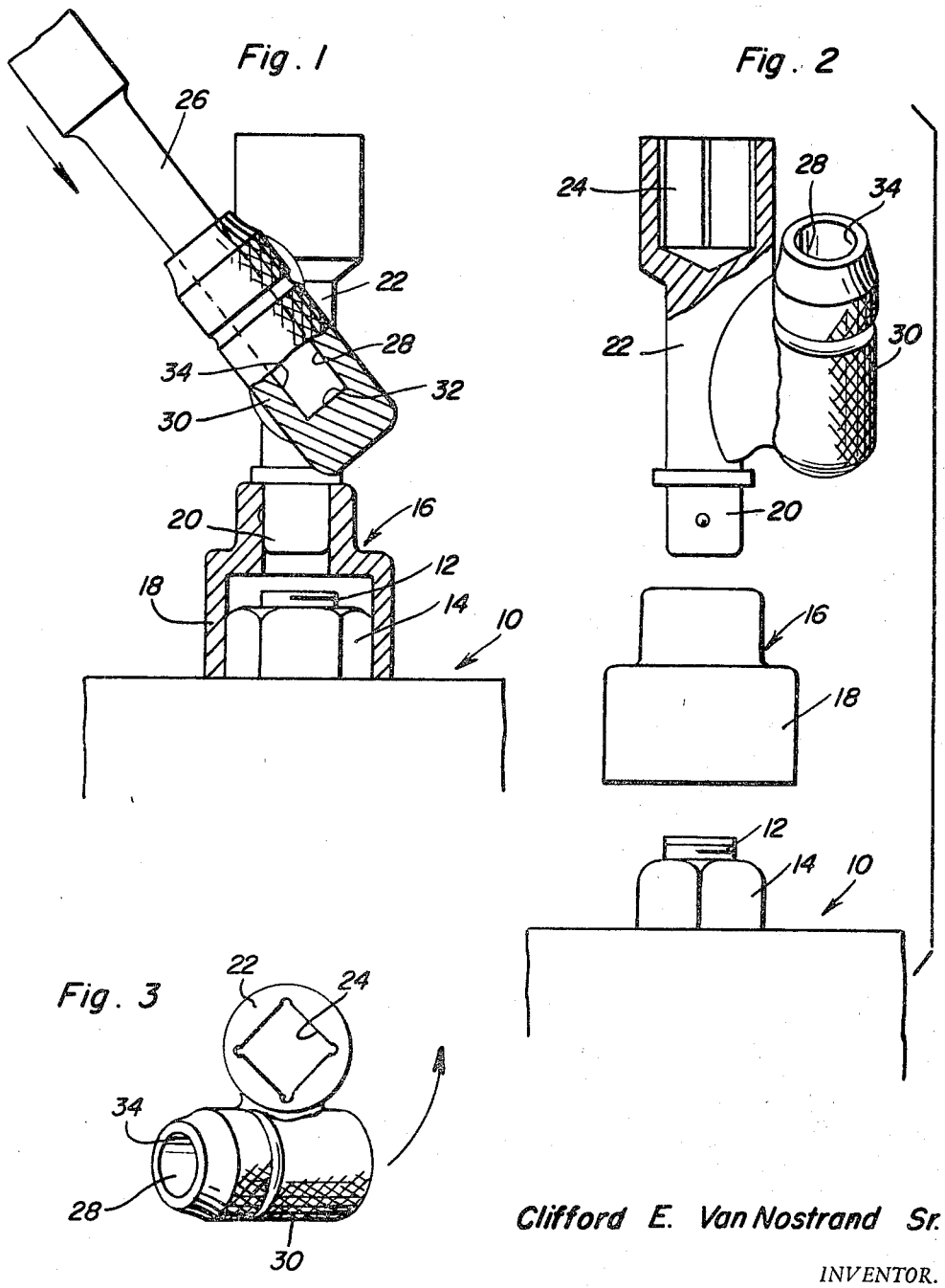
Clifford E. Van Nostrand Sr.
INVENTOR.

United States Patent Office 3,422,910
Patented Jan. 21, 1969

3,422,910
TORQUE INPUT SHAFT AIR HAMMER ATTACHING DEVICE
Clifford E. van Nostrand, Sr., R.D. 2,
Germantown, N.Y. 12526
Filed Apr. 25, 1967, Ser. No. 633,530
U.S. Cl. 173—93           3 Claims
Int. Cl. B25d 15/00; B25b 19/00

ABSTRACT OF THE DISCLOSURE

An elongated rigid torque transmitting member including a longitudinal axis and means defining an abutment member against which impact forces may be solidly directed along a linear path inclined relative to the center axis of said transmitting member and a plane disposed normal to the center axis, the abutment member including abutment surface means against which said impact forces are adapted to be solidly directed and disposed generally in a plane normal to the aforementioned path and which intersects with the center axis of the torque transmitting member generally at the same point a plane normal to the center axis of the torque transmitting member and containing the abutment surface means intersects with the center axis of the torque transmitting member.

---

The torque input shaft of the instant invention consists of an elongated torque transmitting shaft of rigid material having a rigid socket member secured thereto and which opens outwardly along a path inclined relative to the center axis of the torque transmitting shaft or member and a plane disposed normal to the longitudinal axis of the torque transmitting member. Further, the inner closed end of the socket member is disposed in a plane normal to and intersecting with the center axis of the torque transmitting shaft at a point in which a plane disposed normal to the direction in which the socket member opens and containing the inner end of the socket intersects with the longitudinal axis of the torque transmitting shaft. In this manner, any impact forces directed upon the inner end of the socket are transmitted to the shaft at a point along a radius of the shaft disposed at right angles to the direction in which the socket opens.

The main object of this invention is to provide a torque transmitting shaft including means by which the reciprocal impact member of an air hammer may impact with the torque transmitting shaft in a manner transmitting torsional forces through the shaft to either end thereof.

Another object of this invention is to provide a torque input shaft air hammer attaching device in accordance with the preceding object and which may be readily utilized to transfer impact forces from an air hammer or the like to a nut or bolt with which the device is operatively connected in a manner to turn the nut or bolt.

Yet another object of this invention is to provide a device in accordance with the preceding objects and constructed in a manner whereby it may be utilized to turn a nut or bolt in either a counterclockwise direction or a clockwise direction.

A final object of this invention to be specifically enumerated herein is to provide a device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the device of the instant invention illustrating the device operatively associated with a nut which is to be turned and the reciprocal member of an air hammer to be utilized in turning the nut, portions of the device and an associated socket member being broken away and illustrated in vertical section;

FIGURE 2 is an exploded elevational view of the assemblage illustrated in FIGURE 1 and as seen from the left side of FIGURE 1 with further portions of the device broken away and illustrated in vertical section; and FIGURE 3 is a top plan view of the device comprising the instant invention.

Referring now more specifically to the drawings, the numeral 10 generally designates a body through which an externally threaded shank portion 12 has been secured by means of a threaded nut 14. A socket member referred to in general by the reference numeral 16 has one end portion 18 snugly telescoped over the nut 14 and has the square end portion 20 of a socket wrench extension member 22 snugly received within its other end.

The end of the extension member 22 remote from the socket member 16 is provided with an endwise outwardly opening socket or recess 24 which is generally square in cross-sectional shape and is adapted to receive a square end portion or projection such as end portion 20 of a socket wrench or the like. In this manner, torsional forces may be applied to the nut 14 through the extension member 22 with the socket member 16 by utilizing a socket wrench operatively connected to the extension member 22 as a lever. Therefore, if the nut is not too greatly tightened on the shank portion 12, it may be removed from the shank portion 12 in the conventional manner.

However, if the nut 14 is too greatly tightened to be loosened by hand, the reciprocal member 26 of an air actuated impact hammer or the like may be telescopingly seated within the recess 28 defined in the elongated body 30 secured to the extension member 22 and against the lower end wall 32 of the elongated body which closes the inner end of the recess 28. Of course, the side wall portions 34 of the recess or socket 28 define guiding surfaces for the side surfaces of the reciprocal member 26. Then, upon actuation of the associated air hammer, the reciprocal member 26 will be reciprocated and the lower end thereof will solidly impact with the end wall 32.

As can best be seen from FIGURE 2 of the drawings, the elongated body 30 is mounted on one side of the extension member 22 and therefore impact of the lower end of the reciprocal member with the end wall 32 will apply torsional forces on the extension member 22 to rotate the latter in a counterclockwise direction as viewed from above so as to loosen the nut 14.

Inasmuch as the elongated recess or socket 28 is inclined relative to the longitudinal axis of the extension member 22, impact of the reciprocal member 26 with the end wall 32 will also have a tendency to push downward on the extension member 22 and thus the socket member 16 telescoped over the nut 14. This downward force will of course serve to maintain the socket member 16 fully engaged with the nut 14 and will resist any tendency of the socket members 16 to be cammed upward relative to the nut 14 should the upper corners of the nut 14 be worn to a rounded condition.

It will be noted that the end wall 32 includes at least a portion thereof disposed in a horizontal plane normal to and intersecting with the longitudinal center line of the extension member 22 at a point at which the plane disposed normal to the longitudinal center axis of the recess or socket and containing the end wall 32 also intersects the longitudinal center line of the extension member 22. Accordingly, at least a portion of the abutment surface defined by the inner surface of the end wall 32 is disposed along a radius of the center axis of the extension member 22 which is disposed at right angles to the direction in which the socket or recess 28 opens.

It is also contemplated that the elongated body 30 could be longer so that its lower end, as viewed in FIGURE 1, would be extended and could be provided with an outwardly opening recess such as recsss 28 and with a partition defined between the lower end recess and the recess 28. With the elongated body 30 thus constructed, the extension member 22 could be readily inverted and utilized in the same manner in conjunction with a nut which is square in cross-sectional shape. Also, the elongated body 30 could be reversely inclined relative to the extension member 22 so that the latter could be utilized, in conjunction with the reciprocal member 26, to tighten the nut 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An elongated torque transmitting member including means on one end for non-rotatable telescopic engagement with a member to be rotated about the center axis of said torque transmitting member and means on the other end for non-rotatable telescopic engagement with a torque input member, an elongated body rigidly supported from one side of said member closely adjacent the center axis of said torque transmitting member and inclined between thirty and sixty degrees relative to the longitudinal axis thereof, one end portion of said body extending outwardly beyond a side of said member adjacent said one side thereof and including an endwise outwardly opening recess including an inner end wall disposed generally in a plane normal to the center line of said recess and which intersects with said axis generally at the same point a plane normal to said axis and through which said end wall extends intersects with said axis, said recess including side wall portions defining elongated generally straight guide surfaces generally paralleling the longitudinal center line of said recess adapted to guidingly engage a reciprocal impact member impacting with said end wall, the opposite ends of said elongated body being disposed between and substantially spaced from planes in which the terminal ends of the torque transmitting member are disposed and lying normal to the center axis of the torque transmitting member.

2. The combination of claim 1 wherein said means on said one end of said member defines a non-circular extension.

3. The combination of claim 1 wherein said elongated torque transmitting member comprises a socket wrench extension including a non-circular projection on one end comprising the first-mentioned means and an endwise outwardly opening non-circular socket at its other end comprising the second-mentioned means.

References Cited

UNITED STATES PATENTS

| 1,941,565 | 1/1934 | Mandl | 81—53 |
| 3,083,598 | 4/1963 | Kinnison | 81—52.3 |
| 3,158,050 | 11/1964 | Shandel | 81—53 |

OTHER REFERENCES

American Machinist, Sept. 9, 1915, vol. 43, No. 11, p. 444.

JAMES L. JONES, JR., *Primary Examiner.*

U.S. Cl. X.R.

81—52.3